(12) United States Patent
Suciu et al.

(10) Patent No.: US 7,874,802 B2
(45) Date of Patent: *Jan. 25, 2011

(54) TIP TURBINE ENGINE COMPRISING TURBINE BLADE CLUSTERS AND METHOD OF ASSEMBLY

(75) Inventors: Gabriel L. Suciu, Glastonbury, CT (US); James W. Norris, Lebanon, CT (US); Craig A. Nordeen, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 934 days.

This patent is subject to a terminal disclaimer.

(21) Appl. No.: 11/718,522

(22) PCT Filed: Dec. 1, 2004

(86) PCT No.: PCT/US2004/040212

§ 371 (c)(1),
(2), (4) Date: May 3, 2007

(87) PCT Pub. No.: WO2006/060012

PCT Pub. Date: Jun. 8, 2006

(65) Prior Publication Data

US 2007/0292270 A1    Dec. 20, 2007

(51) Int. Cl.
*F01D 5/30* (2006.01)

(52) U.S. Cl. .................... 416/191; 416/204 A; 416/215

(58) Field of Classification Search ................ 416/215, 416/219 R, 191, 248, 220 R, 217, 204 A, 416/210 A; 29/889.22; 415/190
See application file for complete search history.

(56) References Cited

U.S. PATENT DOCUMENTS

| 1,466,324 | A | * | 8/1923 | Wilkinson | .................. 416/215 |
| 1,544,318 | A | | 6/1925 | Hodgkinson | |
| 2,221,685 | A | | 11/1940 | Smith | |
| 2,414,410 | A | | 1/1947 | Griffith | |
| 2,499,831 | A | | 3/1950 | Palmatier | |
| 2,548,975 | A | | 4/1951 | Hawthorne | |
| 2,611,241 | A | | 9/1952 | Schulz | |
| 2,620,554 | A | | 12/1952 | Mochel et al. | |
| 2,698,711 | A | | 1/1955 | Newcomb | |
| 2,801,789 | A | | 8/1957 | Moss | |
| 2,830,754 | A | | 4/1958 | Stalker | |
| 2,874,926 | A | | 2/1959 | Gaubatz | |
| 2,989,848 | A | | 6/1961 | Paiement | |

(Continued)

FOREIGN PATENT DOCUMENTS

DE          767704          5/1953

(Continued)

*Primary Examiner*—Richard Edgar
(74) *Attorney, Agent, or Firm*—Carlson, Gaskey & Olds, PC

(57) ABSTRACT

A tip turbine engine comprises a fan-turbine rotor assembly that includes one or more turbine ring rotors. Each turbine ring is assembled from a multitude of turbine blade clusters. Assembly of a multitude of turbine blade clusters to a diffuser includes axial installation and radial rotation. The clusters are axially installed, then rotated toward a radial stop in a direction which will maintain each cluster against the radial stop during operation of the fan-turbine rotor assembly. A multitude of turbine rotor ring stages may also be locked together to future increase the rigidity of the turbine.

17 Claims, 14 Drawing Sheets

U.S. PATENT DOCUMENTS

| | | | |
|---|---|---|---|
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,687,413 A * | 8/1987 | Prario ........................ 415/190 |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE037,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 765809 | 11/1954 |
| DE | 1301634 | 8/1969 |
| DE | 2361310 | 6/1975 |
| DE | 3333437 | 4/1985 |
| EP | 77236 A1 * | 4/1983 |
| EP | 0661413 | 7/1995 |
| FR | 1033849 | 7/1953 |
| FR | 2566835 | 1/1986 |
| GB | 766728 | 1/1957 |
| GB | 958842 | 5/1964 |
| GB | 1046272 | 10/1966 |
| GB | 1287223 | 8/1972 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059980 | 6/2006 |
| WO | 2006059990 | 6/2006 |
| WO | 2006059996 | 6/2006 |
| WO | 2006060001 | 6/2006 |
| WO | 2006060003 | 6/2006 |
| WO | 2006060005 | 6/2006 |
| WO | 2006060009 | 6/2006 |
| WO | 2006060012 | 6/2006 |
| WO | 2006059997 | 11/2006 |

* cited by examiner

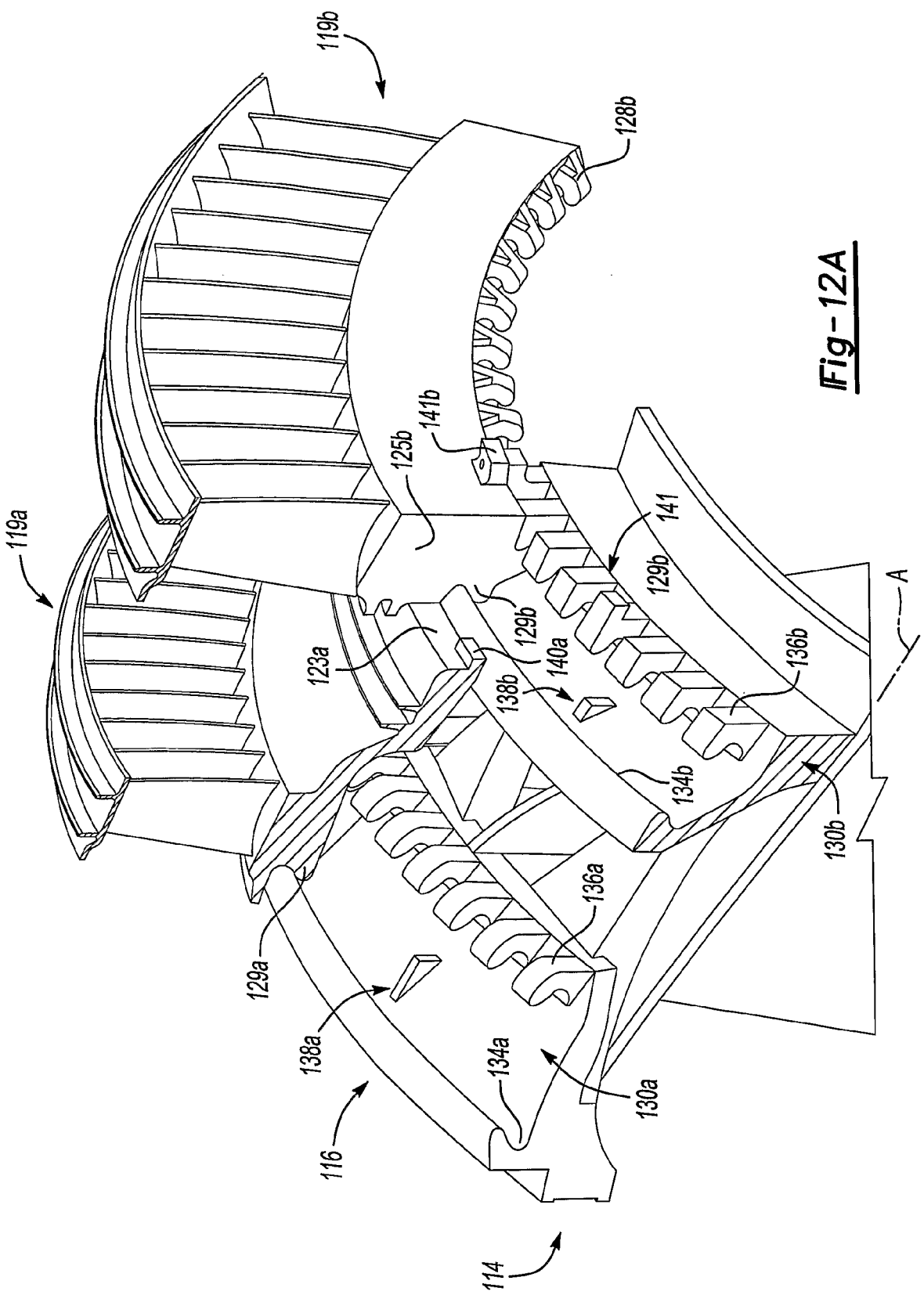

TIP TURBINE ENGINE COMPRISING TURBINE BLADE CLUSTERS AND METHOD OF ASSEMBLY

BACKGROUND OF THE INVENTION

The present invention relates to a gas turbine engine, and more particularly to the attachment of a tip turbine ring rotor upon a bypass fan of a tip turbine engine.

An aircraft gas turbine engine of the conventional turbofan type generally includes a forward bypass fan a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. patent application Publication Nos.: 20030192303; 20030192304; and 20040025490.

The tip turbine engine provides a thrust to weight ratio equivalent to conventional turbofan engines of the same class within a package of significantly shorter length.

The tip turbine engine utilizes a fan-turbine rotor assembly which integrates a turbine onto the outer periphery of the bypass fan. Integrating the turbine onto the tips of the hollow bypass fan blades provides an engine design challenge.

Accordingly, it is desirable to provide a turbine for a fan-turbine rotor assembly, which is readily manufactured and mountable to the outer periphery of a bypass fan.

SUMMARY OF THE INVENTION

The fan-turbine rotor assembly according to the present invention includes one or more turbine ring rotors. Each turbine ring rotor includes a multitude of turbine blade clusters defined about the engine centerline and mounted to a diffuser of the fan-turbine rotor. By forming the turbine blades in clusters, leakage between adjacent blade platforms is minimized which increases engine efficiency.

Assembly of the turbine blade clusters to an diffuser includes axial installation along an engine axis such that segmented attachment lugs are passed through a segmented aft slot surface of an engine base surface. The turbine blade clusters are then rotated about the engine axis to radially position the segmented attachment lugs adjacent the segmented aft slot surface lugs to radially and axially retain the turbine blade cluster to the engine base surface. Each cluster is rotated toward a radial stop in a direction which will maintain the turbine ring rotor against the radial stop during operation of the fan-turbine rotor assembly. A multitude of turbine rotor ring stages may also be locked together to further increase the rigidity of the turbine.

The present invention therefore provides a turbine blade cluster for a fan-turbine rotor assembly, which is readily manufactured and mountable to the outer periphery of a bypass fan.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 12A is an expanded perspective view of a first stage and a second stage turbine rotor ring in a first mounting position relative to a diffuser ring of a fan-turbine rotor assembly;

DETAILED DESCRIPTION OF THE PREFERRED EMBODIMENT

Figure 1:
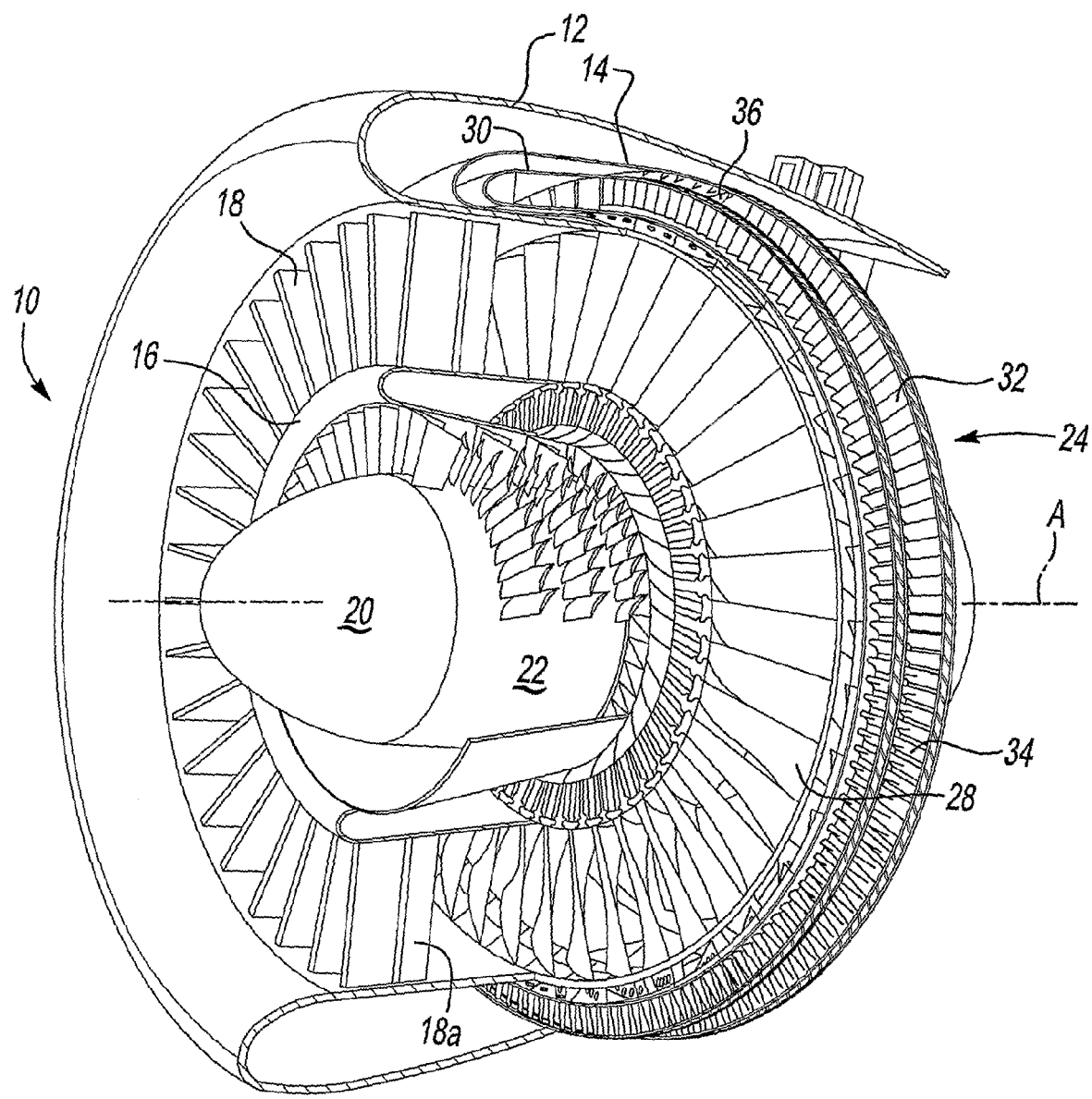
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a nonrotatable static outer support structure 14 and a nonrotatable static inner support structure 16. A multitude of fan inlet guide vanes 18 are mounted between the static outer support structure 14 and the static inner support structure 16. Each inlet guide vane preferably includes a variable trailing edge 18A.

A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28. The hollow fan blades 28 communicate this compressed air from the axial compressor 22 to an annular combustor 30. The hollow fan blades 28 provide internal, centrifugal compression of the compressed airflow to increase compression of the airflow for distribution to the annular combustor 30 located within the nonrotatable static outer support structure 14.

A turbine 32 includes a multitude of tip turbine blades 34 (two stages shown) which rotatably drive the hollow fan blades 28 relative to a multitude of tip turbine stators 36 which extend radially inwardly from the static outer support structure 14. The annular combustor 30 is axially forward of the turbine 32 and communicates with the turbine 32.

Figure 2:
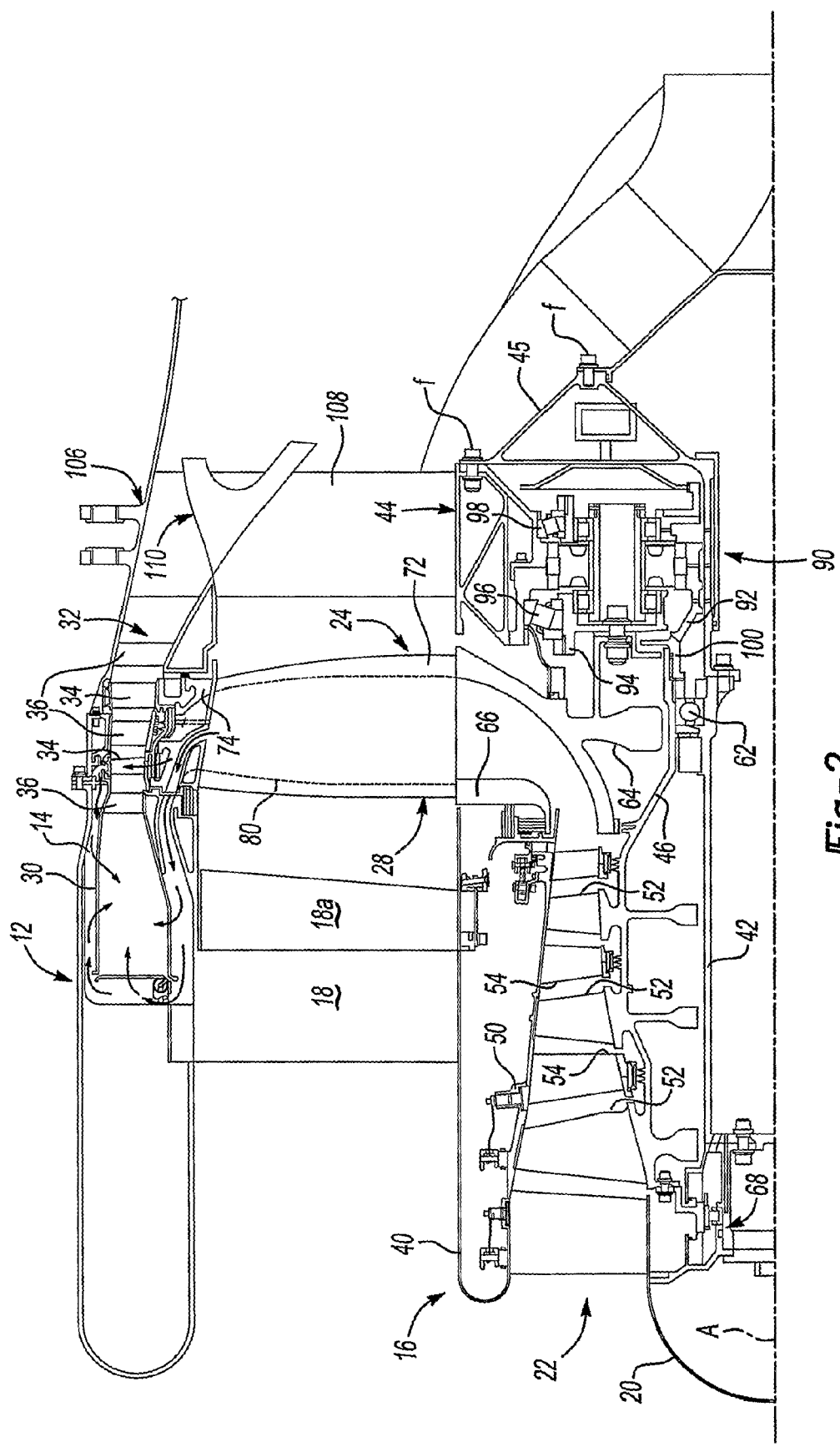
FIG. 2 is a longitudinal sectional view of a tip turbine engine along an engine centerline.

Referring to FIG. 2, the nonrotatable static inner support structure 16 includes a splitter 40, a static inner support housing 42 and a static outer support housing 44 located coaxial to said engine centerline A.

The axial compressor 22 includes the axial compressor rotor 46 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused by the diffuser section 74 toward an axial airflow direction toward the annular combustor 30. Preferably the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the core airflow passage 80 of the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan blades 28 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the nonrotatable static outer support structure 14 to guide the combined airflow out of the engine 10 to provide forward thrust. An exhaust mixer 110 mixes the airflow from the turbine blades 34 with the bypass airflow through the fan blades 28.

Figure 3:
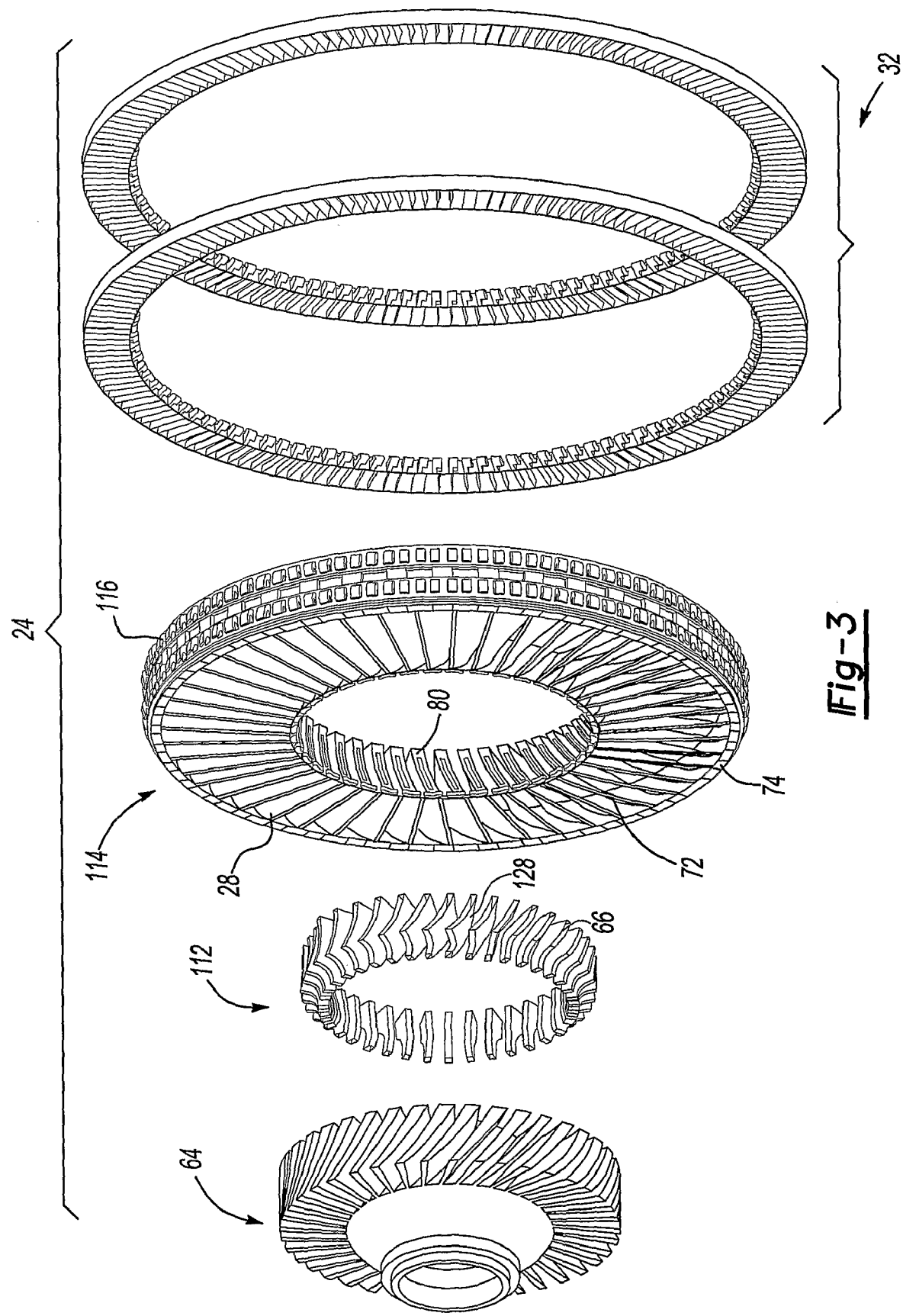
FIG. 3 is an exploded view of a fan-turbine rotor assembly.
Figure 4:
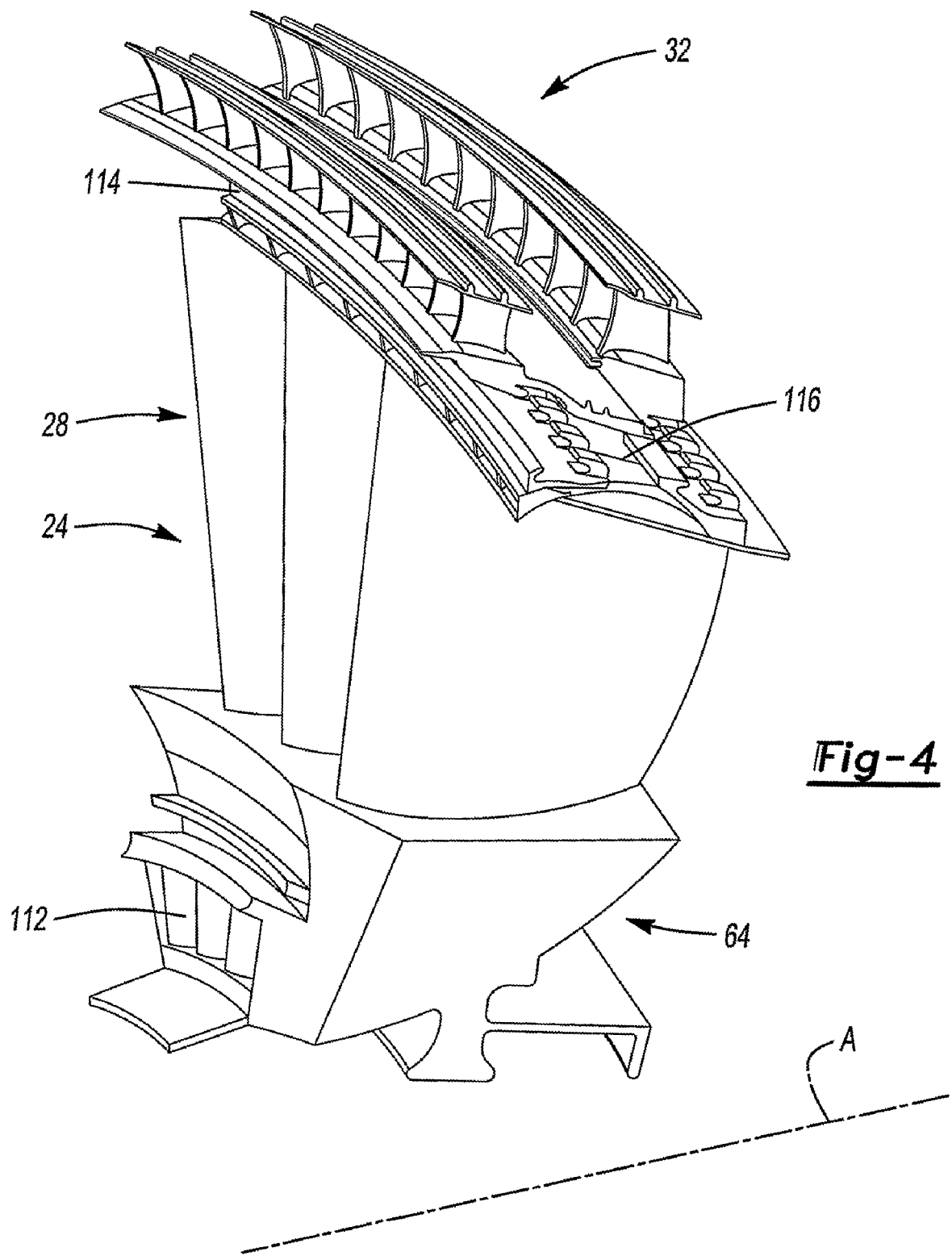
FIG. 4 is an expanded partial perspective view of a fan-turbine rotor assembly.

Referring to FIG. 3, the fan-turbine rotor assembly 24 is illustrated in an exploded view. The fan hub 64 is the primary structural support of the fan-turbine rotor assembly 24 (also illustrated as a partial sectional view in FIG. 4). The fan hub 64 supports an inducer 112, the multitude of fan blades 28, a diffuser 114, and the turbine 32.

Figure 5:
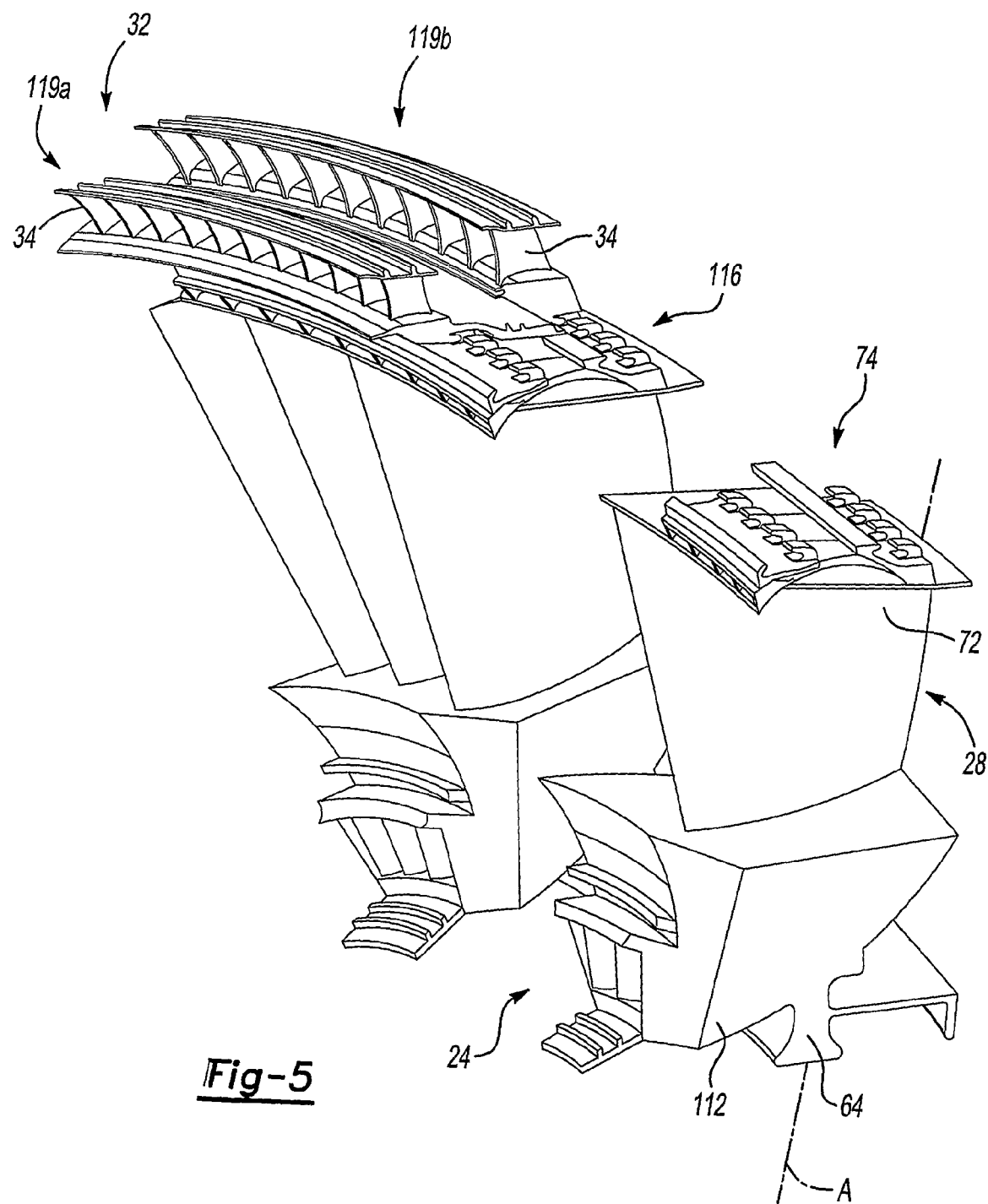
FIG. 5 is an expanded partial perspective view of a fan-turbine rotor assembly illustrating a single fan blade segment.

Referring to FIG. 5, the diffuser 114 defines a diffuser surface 116 formed by the multitude of diffuser sections 74 (FIG. 5). The diffuser surface 116 is formed about the outer periphery of the fan blade sections 72 to provide structural support to the outer tips of the fan blade sections 72 and to turn and diffuse the airflow from the radial core airflow passage 80 toward an axial airflow direction. The turbine 32 is mounted to the diffuser surface 116 as one or more turbine ring rotors 118a, 118b which include a multitude of turbine blade clusters 119a, 119b (FIGS. 6A and 6B).

Preferably, each fan blade section 72 includes an attached diffuser section 74 such that the diffuser surface 116 is formed when the fan-turbine rotor assembly 24 is assembled. It should be understood, however, that the fan-turbine rotor assembly 24 may be formed in various ways including casting multitude sections as integral components, individually manufacturing and assembling individually manufactured components, and/or other combinations thereof.

Figure 6:
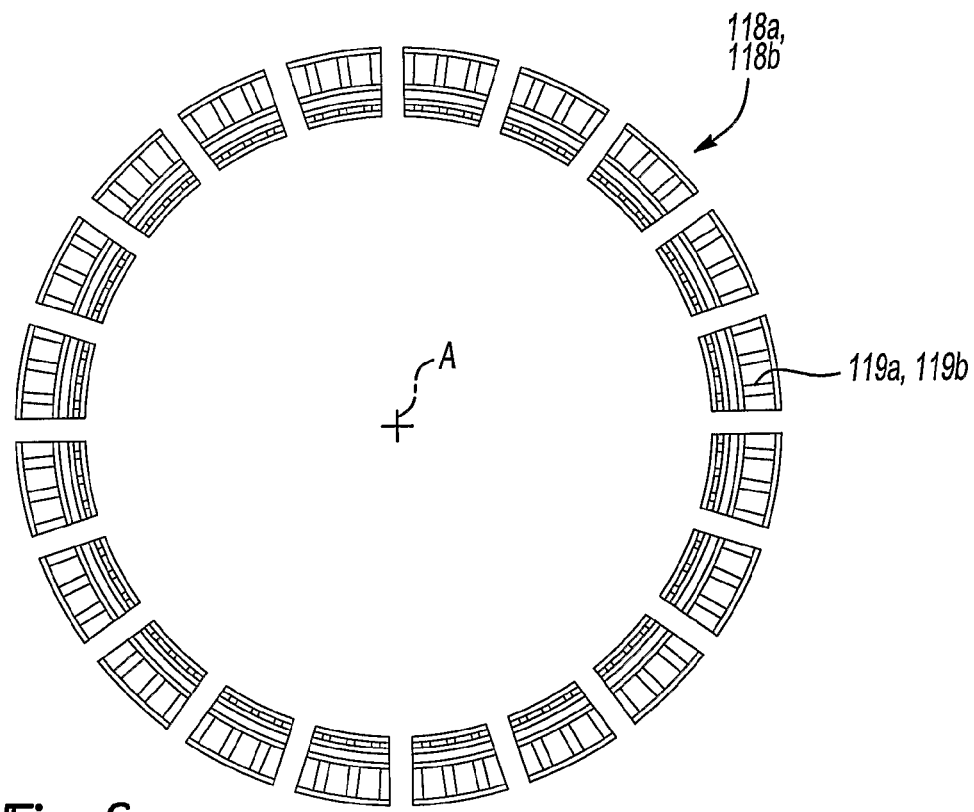
FIG. 6A is an expanded exploded view of a segmented turbine rotor ring.
FIG. 6B is an expanded front view of a turbine rotor ring.

Referring to FIG. 6A, a multitude of the turbine blade clusters 119a, 119b respectively form the turbine ring rotor 118a, 118b defined about the engine centerline A. By forming the turbine 32 as a multitude of clusters, leakage between adjacent blade platforms is minimized which increases engine efficiency. Manufacturing and assembly is also readily facilitated considering the casting detail level involved. Another advantage is that by forming the turbine 32 as a multitude of clusters 119a, 119b the turbine hoop load path is broken. Breaking the turbine hoop load path reduces the thermal contrast between the turbine blade clusters 119a, 119b and the diffuser 114.

As discussed herein, the turbine ring rotor 118a is a first stage of the turbine 32, and turbine ring rotor 118b is a second stage of the turbine 32, however, other turbine stages will likewise benefit from the present invention. Furthermore, gas turbine engines other than tip turbine engines will also benefit from the present invention.

Alternatively, each turbine ring rotor 118a', 118b' may be cast as a single integral annular ring cluster (FIG. 6B) defined about the engine centerline A. By forming the turbine 32 as one or more rings, leakage between adjacent blade platforms is minimized which increases engine efficiency.

Figure 7A:
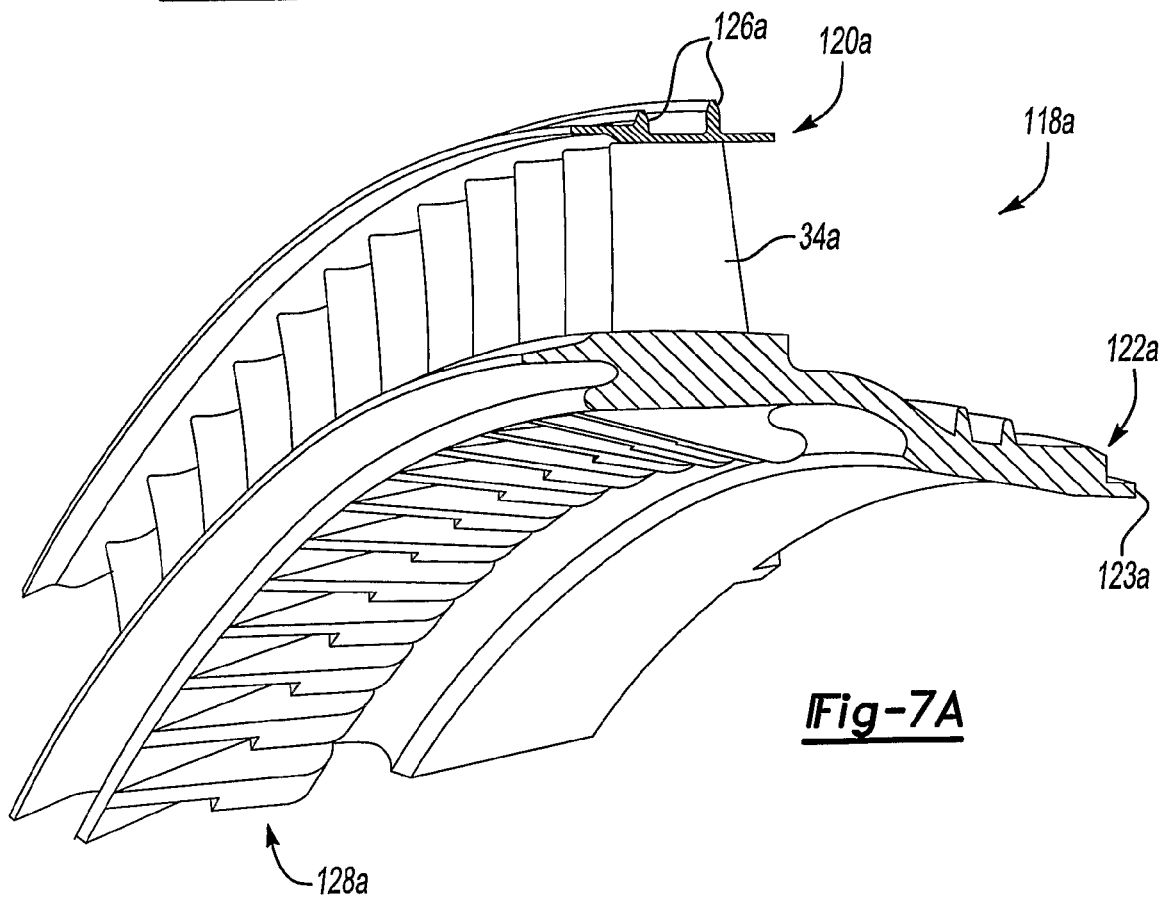
FIG. 7A is an expanded perspective view of a segment of a first stage turbine rotor ring.
Figure 7B:
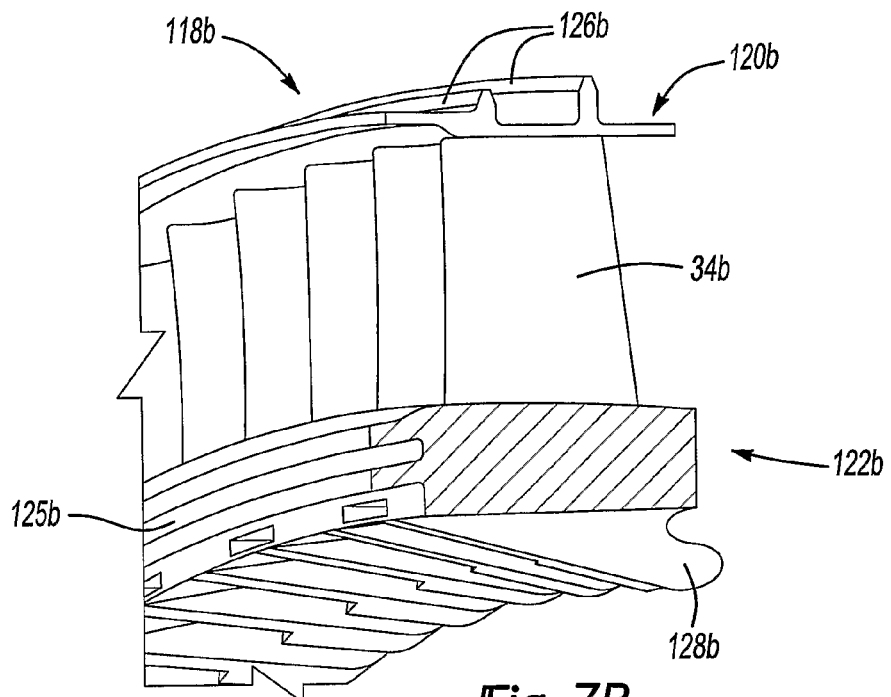
FIG. 7B is an expanded perspective view of a segment of a second stage turbine rotor ring.

Referring to FIGS. 7A and 7B, each turbine blade cluster 119a, 119b includes an arcuate tip shroud 120a, 120b, an arcuate base 122a, 122b and a multitude of turbine blades 34a, 34b mounted between the arcuate tip shroud 120a, 120b and the arcuate base 122a, 122b, respectively. The arcuate tip shroud 120a, 120b and the arcuate base 122a, 122b are generally planar rings defined about the engine centerline A. The arcuate tip shroud 120a, 120b and the arcuate base 122a, 122b provide support and rigidity to the multitude of turbine blades 34a, 34b.

The arcuate tip shroud 120a, 120b each include a tip seal 126a, 126b extending therefrom. The tip seal 126a, 126b preferably extend perpendicular to the arcuate tip shroud 120a, 120b to provide a knife edge seal between the turbine ring rotor 118a, 118b and the nonrotatable static outer support structure 14 (also illustrated in FIG. 8). It should be understood that other seals may alternatively or additionally be utilized.

Figure 8:
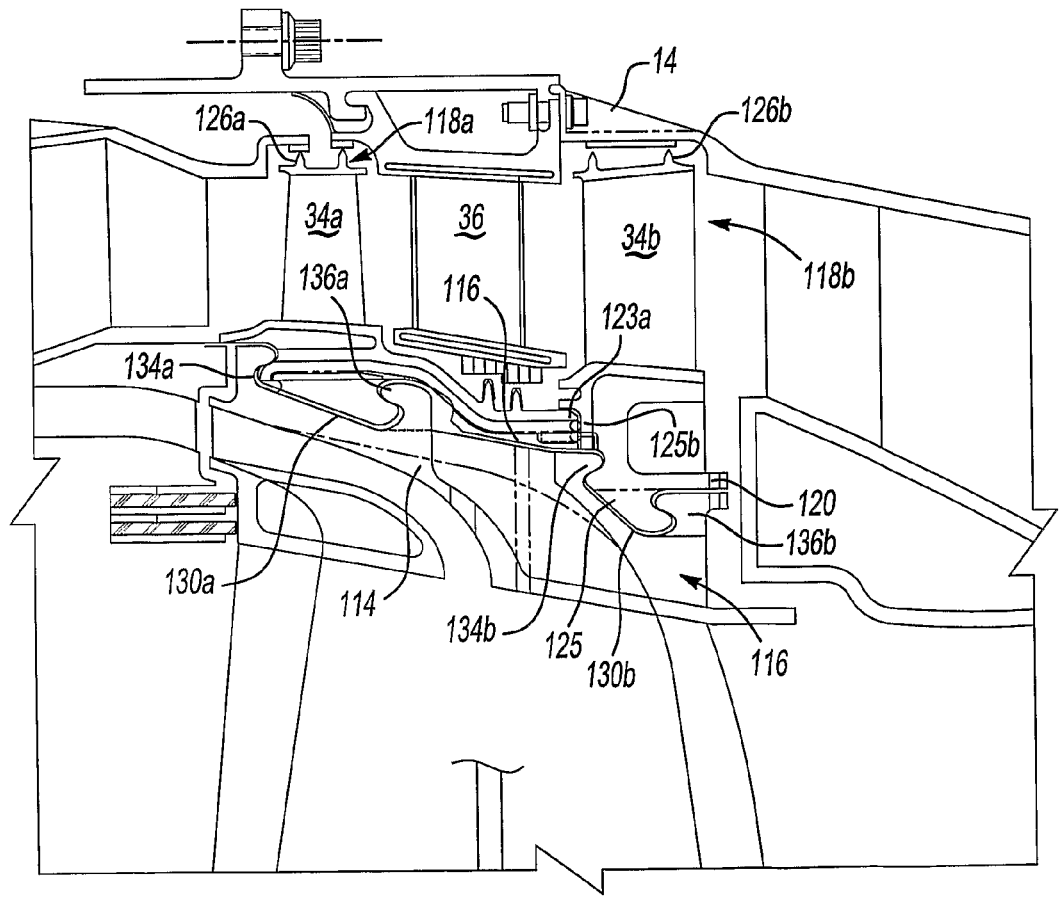
FIG. 8 is a side planar view of a turbine for a tip turbine engine.
Figure 9:
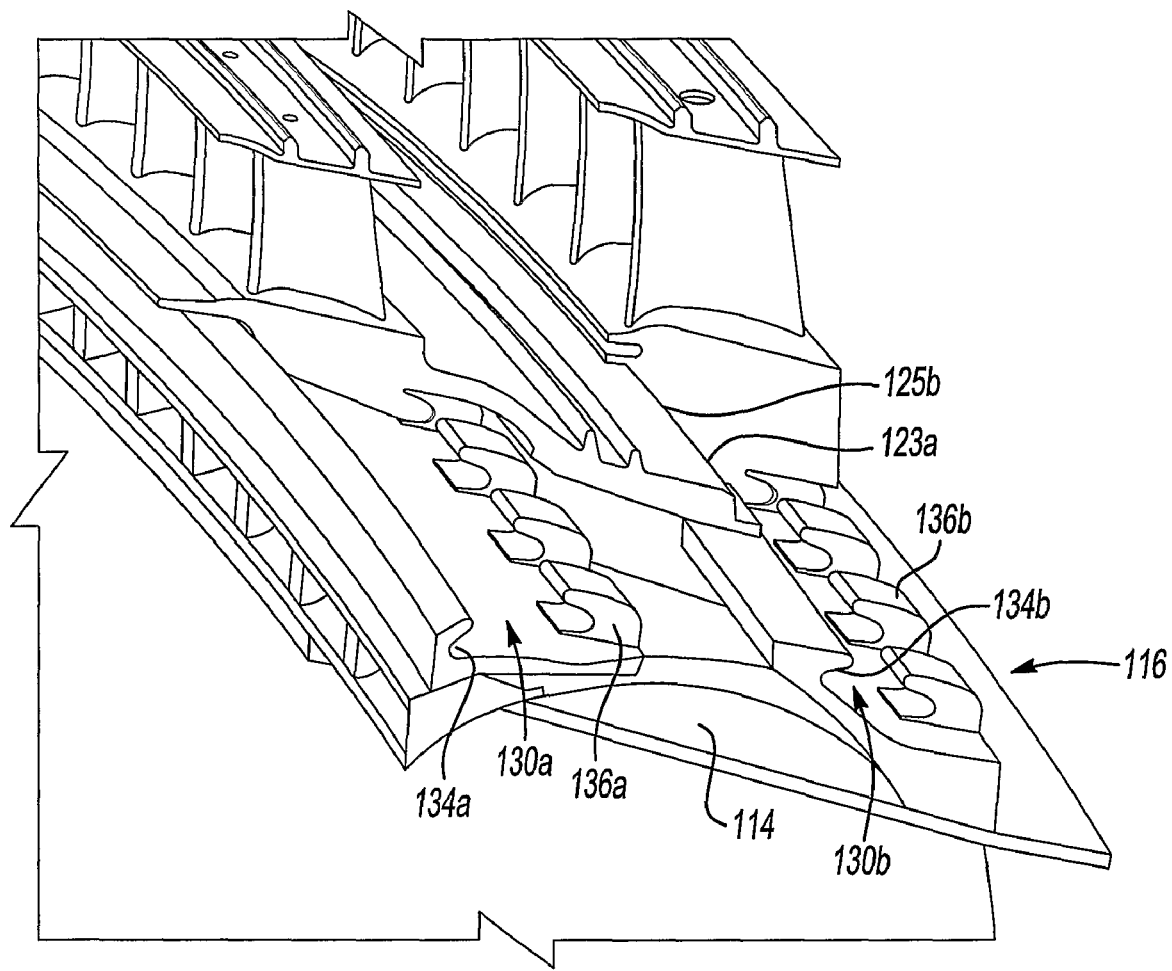
FIG. 9 is an expanded perspective view of a first stage and a second stage turbine rotor ring mounted to a diffuser ring of a fan-turbine rotor assembly.

The arcuate base 122a, 122b includes attachment lugs 128a, 128b. The attachment lugs 128a, 128b are preferably segmented to provide installation by axial mounting and radial engagement of the turbine ring rotor 118a, 118b to the diffuser surface 116 as will be further described. The attachment lugs 128a, 128b preferably engage a segmented attachment slot 130a, 130b formed in the diffuser surface 116 in a dovetail-type, bulb-type or fir tree-type engagement (FIG. 8). The segmented attachment slots 130a, 130b are formed into the diffuser surface 116. The segmented attachment slots 130a, 130b preferably include a continuous forward slot surface 134a, 134b and a segmented aft slot surface 136a, 136b (FIG. 9).

The arcuate base 122a preferably provides an extended axial stepped ledge 123a which engages a seal surface 125b which extends from the arcuate base 122b. That is, arcuate bases 122a, 122b provide cooperating surfaces to seal an outer surface of the diffuser surface 116 (FIG. 9).

Figure 10A:
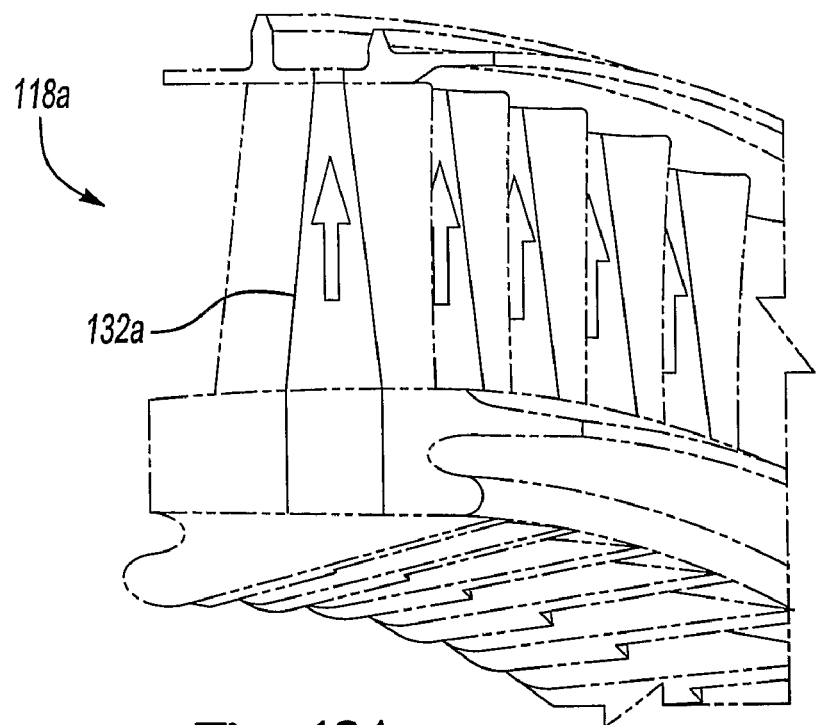
FIG. 10A is an expanded perspective view of a segment of a second stage turbine rotor ring illustrating an airflow passage through a turbine blade.
Figure 10B:
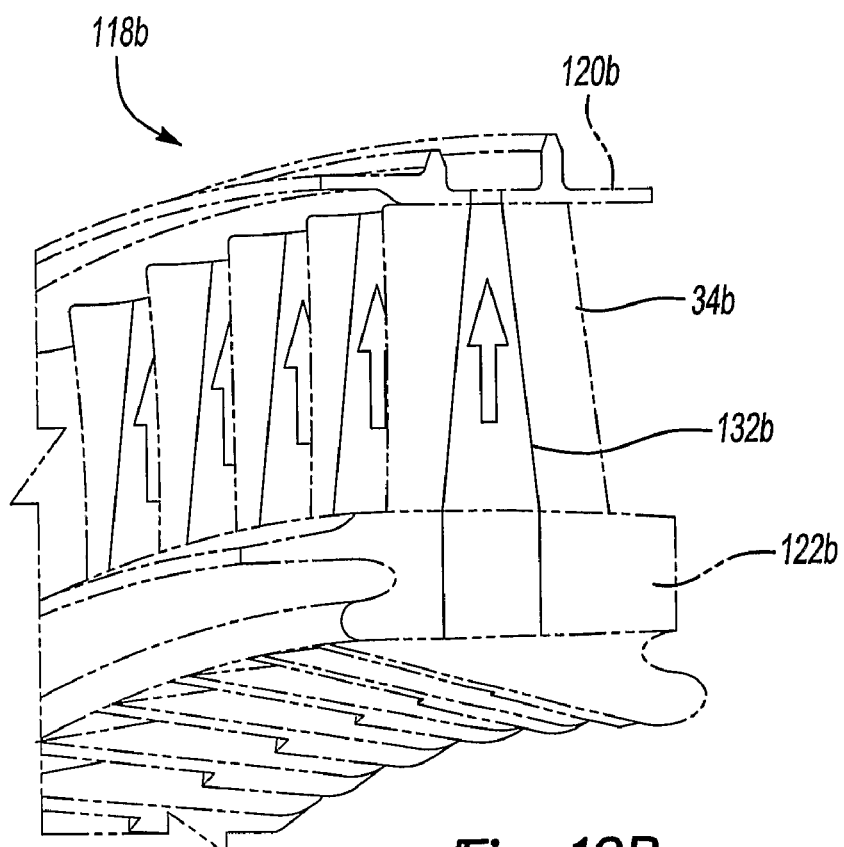
FIG. 10B is an expanded perspective view of a segment of a second stage turbine rotor ring illustrating an airflow passage through a turbine blade.

Referring to FIGS. 10A and 10B, each of the multitude of turbine blades 34a, 34b defines a turbine blade passage (illustrated by arrows 132a, 132b) therethrough. Each of the turbine blade passages 132a, 132b extend through the arcuate tip shroud 120a, 120b and the arcuate base 122a, 122b respectively. The turbine blade passages 132a, 132b bleed air from the diffuser to provide for regenerative cooling (FIG. 11).

Figure 11:
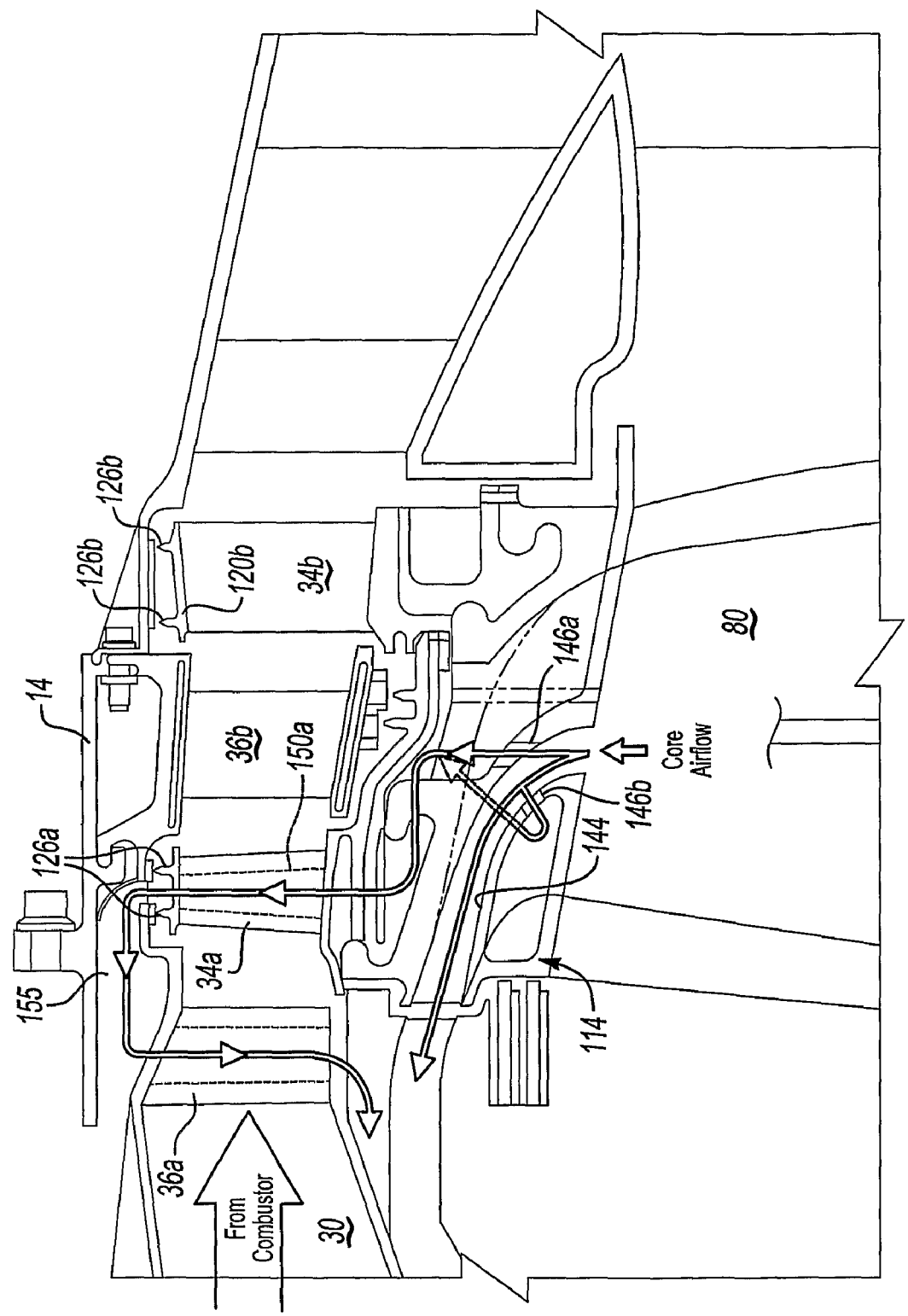
FIG. 11 is a side sectional view of a turbine for a tip turbine engine illustrating a regenerative airflow paths through the turbine.

Referring to FIG. 11, the regenerative cooling airflow exits through the arcuate tip shroud 120a, 120b to receive thermal energy from the turbine blades 34a, 34b. The regenerative cooling airflow also increases the centrifugal compression within the turbine 32 while transferring the increased temperature cooling airflow into the annular combustor to increase the efficiency thereof through regeneration. It should be understood that various regenerative cooling flow paths may be utilized with the present invention.

Figure 12B:
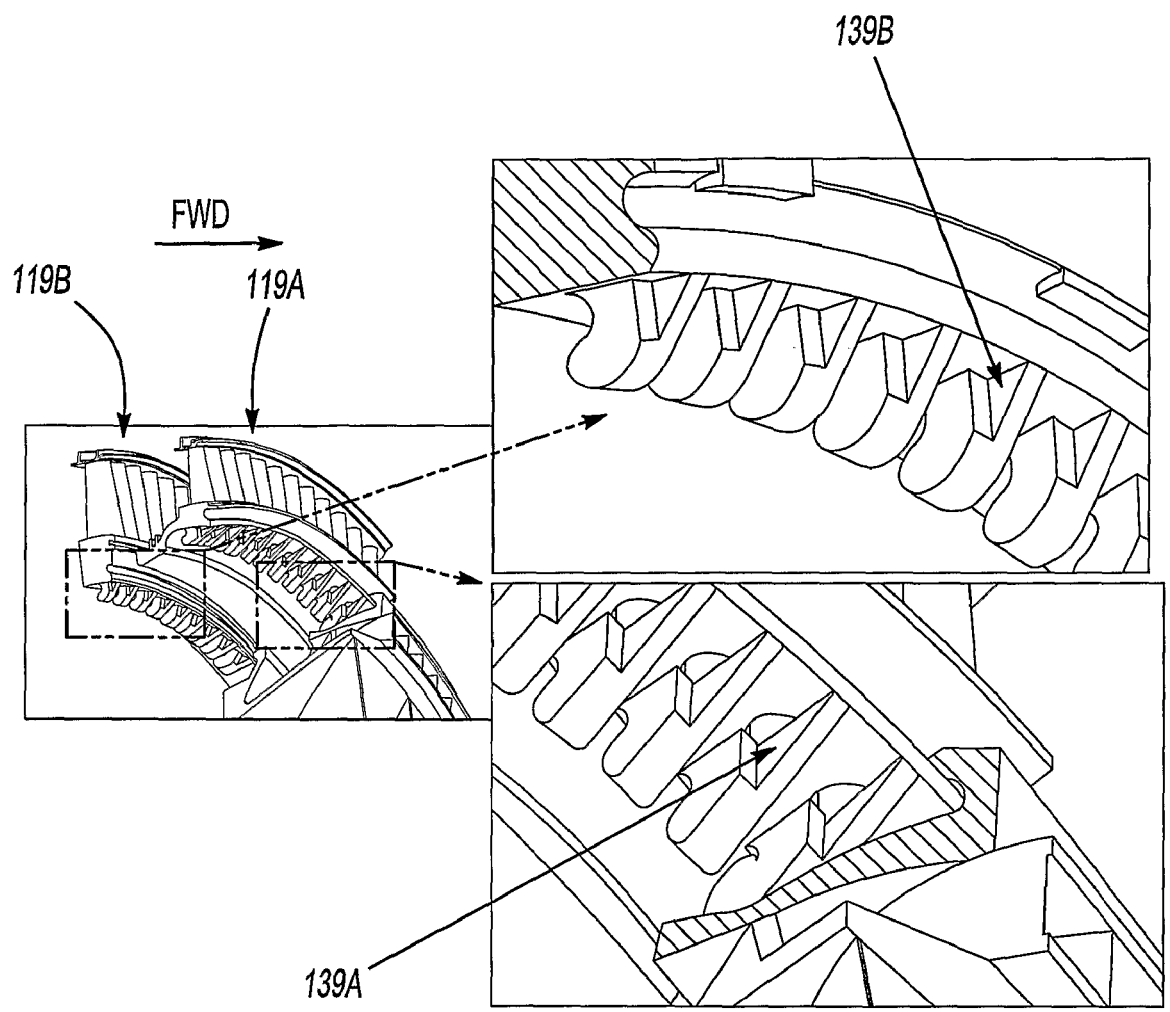
FIG. 12B is an expanded perspective view of a first stage and a second stage turbine rotor ring illustrating turbine torque load surface on each turbine rotor ring.

Referring to FIG. 12A, assembly of the turbine 32 to the diffuser surface 116 will be describe with reference to the turbine ring rotors 118a, 118b which include a multitude of separate turbine blade clusters 119a, 119b (FIG. 6A). Assembly of the blade clusters 119a, 119b to the diffuser surface 116, begins with one of the first stage turbine blade cluster 119a which are first axially mounted from the rear of the diffuser surface 116. The forward attachment lug engagement surface 129a is engaged with the continuous forward slot engagement surface 134a by passing the attachment lugs 128a through the segmented aft slot surface 136a. That is, the attachment lugs 128a are aligned to slide through the lugs of the segmented aft slot surface 136a. All first stage clusters 119a are then installed in this fashion. Next, one of the second stage blade clusters 119b is axially mounted from the rear of the diffuser surface 116. The forward attachment lug engagement surface 129b is engaged with the continuous forward slot engagement surface 134b by passing the attachment lugs 128b through the segmented aft slot surface 136b. That is, the attachment lugs 128b are aligned to slide between the lugs of the segmented aft slot surface 136b.

The extended axial stepped ledge 123a of the arcuate base 122a receives the seal surface 125b of the arcuate base 122b. The second stage turbine blade cluster 119b rotationally locks with the first stage turbine blade cluster 119a through engagement between anti-backout tabs 140a and anti-backout slots 140b (also illustrated in FIG. 12D). The remaining second stage airfoil clusters 119b are installed in the same manner.

A multitude of radial stops 138a, 138b are located upon the diffuser surface 116 to correspond with each of the turbine blade clusters 119a, 119b. Once all of the pairs of clusters 119a, 119b are installed the turbine ring rotors 118a, 118b are completed. The turbine ring rotors 118a, 118b are then rotated as a unit within the segmented attachment slot 130a, 130b so that a torque load surface 139a, 139b (FIGS. 12B-12C) on each turbine cluster 119a, 119b contacts a radial stop 138a, 138b to radially locate the attachment lugs 128a, 128b adjacent the lugs of the segmented aft slot surface 136a, 136b of the segmented attachment slots 130a, 130b.

Preferably, the completed turbine ring rotors 118a, 118b are rotated together toward the radial stops 138a, 138b in a direction which will maintain the turbine ring rotors 118a, 118b against the radial stops 138a, 138b during operation. It should be understood that a multitude of torque load surface 139a, 139b and radial stop 138a, 138b may be located about the periphery of the diffuser surface 116 to restrict each turbine blade cluster 119a, 119b. It should be further understood that other locking arrangements may also be utilized.

Figure 12C:
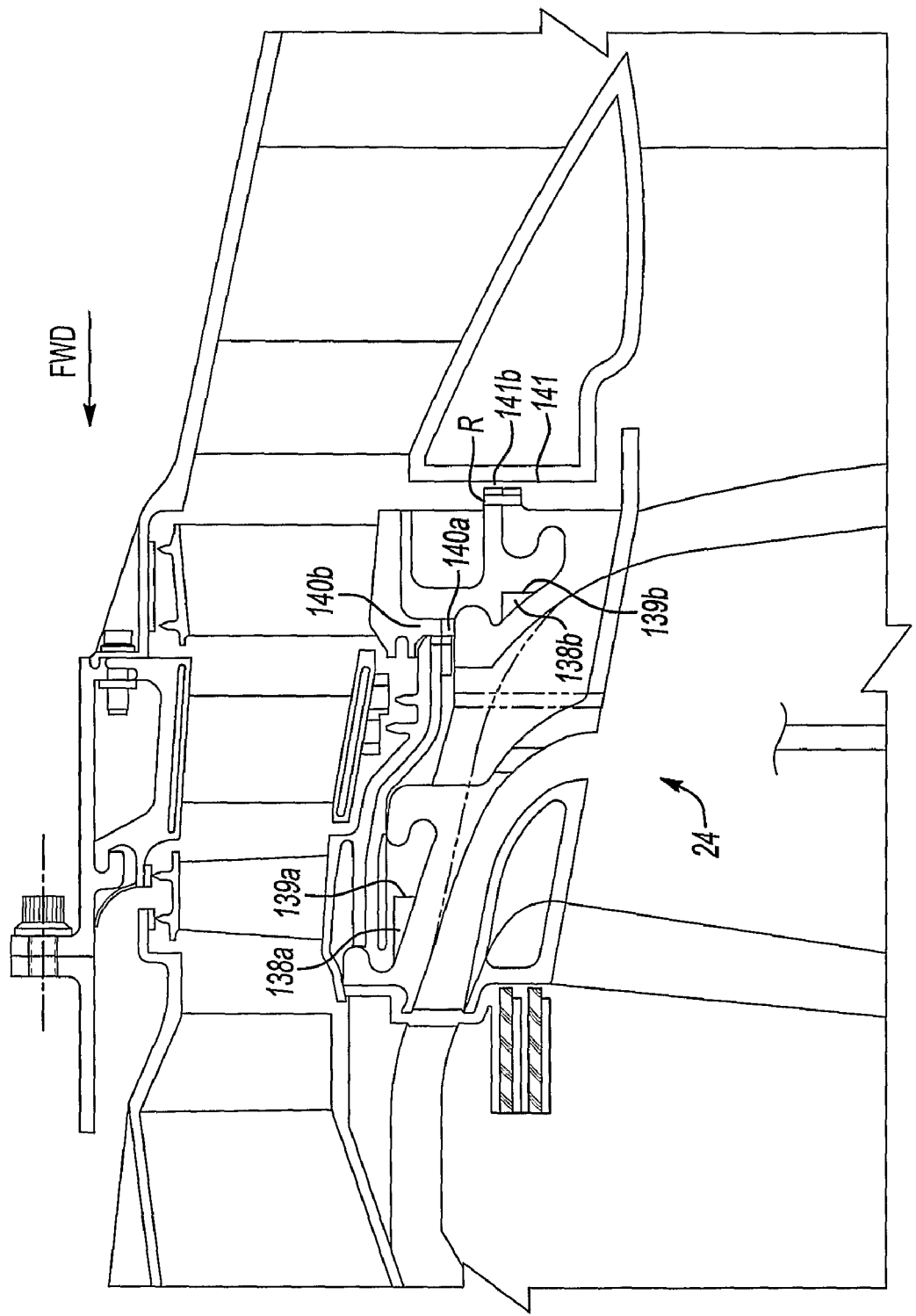
FIG. 12C is a side sectional view of a first stage and a second stage turbine rotor ring illustrating the interaction of the turbine torque load surfaces and adjacent stops.
Figure 12D:
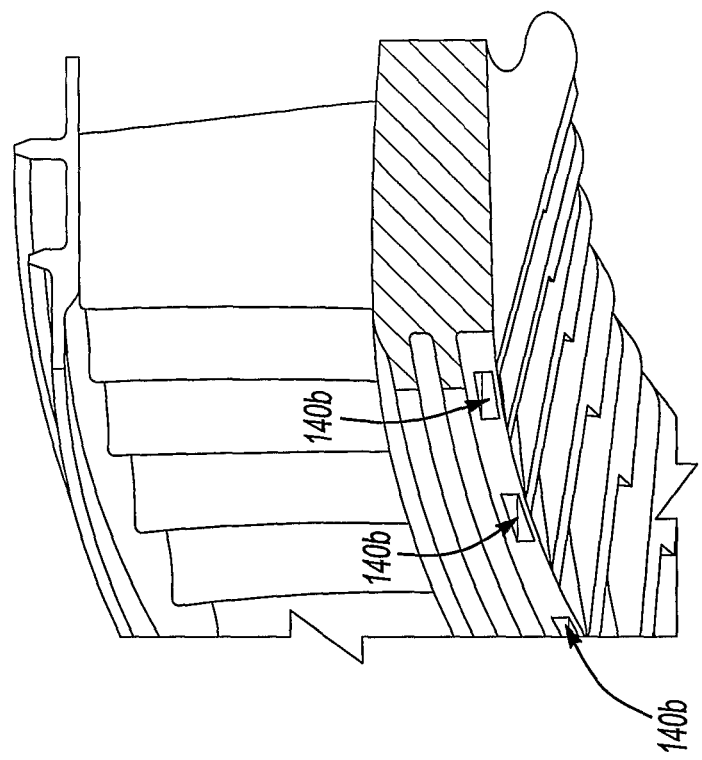
FIG. 12D is an expanded perspective view of a first stage and a second stage turbine rotor ring illustrating the anti-back out tabs and anti-back out slots to lock the first stage and a second stage turbine rotor ring.
Figure 12D:
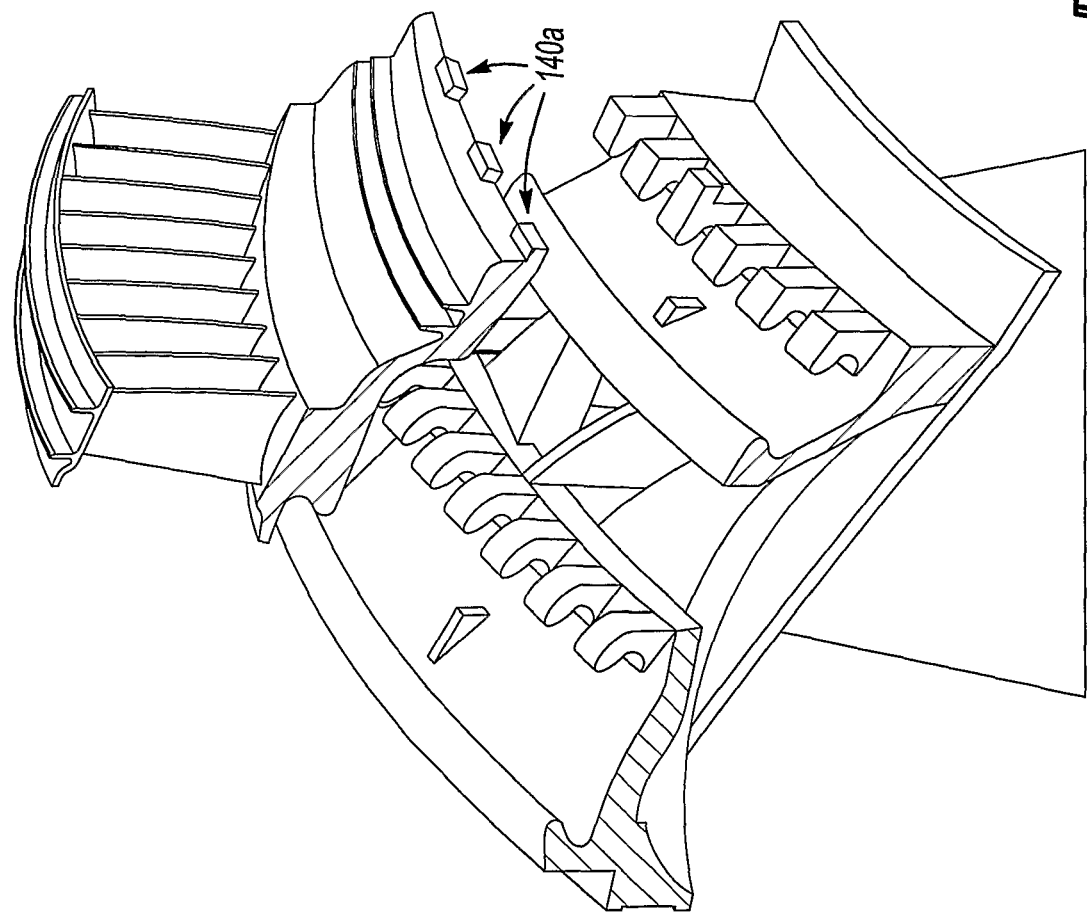

Once the turbine ring rotors 118a, 118b are rotated, a second stage turbine ring anti-backout retainer tab 141b which extends from each of the second stage blade clusters 119b is aligned with an associated anti-backout retainer tab 141 which extends from the diffuser surface 116. A multitude of anti-backout retainer tabs 141 are located about the diffuser surface 116 to correspond with each of the turbine blade clusters 119b. The turbine ring anti-backout retainer tabs 141b and the anti-backout retainer tabs 141 are locked together through a retainer R such as screws, peening, locking wires, pins, keys, and/or plates as generally known. The turbine ring rotors 118a, 118b are thereby locked radially together and mounted to the fan-turbine rotor assembly 24 (FIG. 12C).

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A turbine blade cluster comprising:
   an arcuate tip shroud;
   an arcuate base having a segmented attachment lug;
   a multiple of turbine blades mounted between said arcuate tip shroud and said arcuate base, said arcuate base includes an extended axial stepped ledge; and
   a seal surface on a second stage arcuate base of a second stage turbine to receive said extended axial stepped ledge.

2. The turbine blade cluster as recited in claim 1, wherein each of said turbine blades defines a turbine blade passage therethrough, each of said turbine blade passages extend through said arcuate tip shroud and said arcuate base.

3. The turbine blade cluster as recited in claim 1, wherein said turbine blade cluster comprises a ring.

4. A method of mounting a turbine blade cluster comprising the steps of:
   (1) axially locating a turbine blade cluster along an engine axis such that a multitude of attachment lugs are passed through a segmented aft slot surface; and
   (2) radially rotating the turbine blade cluster about the engine axis relative the segmented aft slot surface to axially position the attachment lugs adjacent a multiple of slot lugs, the segmented aft slot surface to radially and axially retain the turbine blade cluster.

5. A method as recited in claim 4 wherein said step (1) further comprises:
   locating a continuous forward attachment lug engagement surface of the turbine blade cluster within a continuous forward slot.

6. A method as recited in claim 5 wherein said step (1) further comprises:
   pivoting the turbine blade cluster relative the continuous forward attachment lug engagement surface such that the multitude of attachment lugs pass through the segmented aft slot surface.

7. A fan blade assembly for a tip turbine engine comprising:
   a fan blade section which defines a core airflow passage therethrough;
   a diffuser section mounted to said fan blade section, said diffuser section in communication with said core airflow passage to turn said airflow from said radial airflow direction to a second axial airflow direction, said diffuser section forming a segmented attachment slot; and
   a turbine blade cluster mountable to said diffuser section, said turbine blade cluster having a multitude of turbine blades mounted between an arcuate tip shroud and an arcuate base defining a segmented attachment lug engageable with said segmented attachment slot.

8. The fan blade assembly as recited in claim 7 wherein said segmented attachment slot forms a continuous forward slot engagement surface and a segmented aft slot surface.

9. The fan blade assembly as recited in claim 8, wherein said segmented attachment lug includes a forward attachment lug engagement surface engageable with said continuous forward slot engagement surface.

10. The fan blade assembly as recited in claim 7 wherein a multiple of said turbine blade clusters form a turbine ring rotor.

11. The fan blade assembly as recited in claim 10, further comprising a multiple of second stage turbine blade clusters which form a second stage turbine ring rotor engageable with said turbine ring rotor.

12. The fan blade assembly as recited in claim 11, wherein said diffuser section forms a second stage segmented attachment slot to receive said a multiple of second stage turbine blade clusters.

13. The fan blade assembly as recited in claim 7, wherein said turbine cluster defines a turbine blade passage which extends through each of said multitude of turbine blades and through said arcuate tip shroud and said arcuate base.

14. The fan blade assembly as recited in claim 13, wherein each of said turbine blade passages is in communication with said core airflow passage.

15. The fan blade assembly as recited in claim 14, wherein each of said turbine blade passages is in communication with a diffuser passage within said diffuser section in communication with said core airflow passage.

16. A method of assembling a fan-turbine rotor assembly comprising the steps of:
   (1) axially installing a multiple of turbine blade clusters each including a segmented attachment lug into a segmented attachment slot defined within a diffuser surface to form a turbine rotor ring; and
   (2) radially rotating said turbine ring to radially locate a multiple of attachment lugs of the segmented attachment slot adjacent a multiple of lugs of the segmented attachment slot.

17. A method as recited in claim 16, further comprising the step of:
   axially installing a multiple of second stage turbine blade clusters to engage the multiple of turbine blade clusters subsequent to said step (1) and prior to said step (2).

* * * * *